United States Patent
King et al.

(10) Patent No.: US 10,344,507 B2
(45) Date of Patent: Jul. 9, 2019

(54) STEERING COLUMN LOCK CYLINDER MODULE

(71) Applicant: Steering Solutions IP Holding Corporation, Saginaw, MI (US)

(72) Inventors: Todd M. King, Saginaw, MI (US); Christopher F. Watz, Bay City, MI (US); Thomas M. Finney, Midland, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 122 days.

(21) Appl. No.: 15/198,031

(22) Filed: Jun. 30, 2016

(65) Prior Publication Data
US 2017/0066405 A1    Mar. 9, 2017

Related U.S. Application Data

(60) Provisional application No. 62/214,061, filed on Sep. 3, 2015.

(51) Int. Cl.
*B60R 25/021*    (2013.01)
*E05B 85/02*    (2014.01)
(Continued)

(52) U.S. Cl.
CPC .......... *E05B 85/02* (2013.01); *B60R 25/023* (2013.01); *B60R 25/02102* (2013.01); *B60R 25/02142* (2013.01); *E05B 2009/004* (2013.01)

(58) Field of Classification Search
CPC ... E05B 9/00; E05B 9/04; E05B 9/048; E05B 2009/004; E05B 2009/006; E05B 2009/047; E05B 79/00; E05B 79/02; E05B 79/04; E05B 85/02; B60R 25/02; B60R 25/021; B60R 25/02102; B60R 25/02105;
(Continued)

(56) References Cited

U.S. PATENT DOCUMENTS 1,674,513 A  * 6/1928 Jacobi .................... E05B 9/04
                                                 70/367
3,744,283 A    7/1973 Schmidt
(Continued)

FOREIGN PATENT DOCUMENTS

CN    202134444 U    2/2012
CN    203351484 U    12/2013
(Continued)

OTHER PUBLICATIONS

Chinese Office Action and Search Report from the Chinese Patent Office for CN Application No. 201710207930.8 dated Aug. 3, 2018, 12 pages, English Translation Included.

*Primary Examiner* — Christopher J Boswell
(74) *Attorney, Agent, or Firm* — Cantor Colburn LLP

(57) ABSTRACT

A keyed cylinder sleeve includes a body and an anti-rotation feature. The body extends between a first end and a second end along an axis. The body has a first face and second face disposed about the first end, an inner bore configured to receive a keyed cylinder, and a holding block extending from the second face towards the second end. The anti-rotation feature is connected to the body and is disposed adjacent to the holding and is disposed proximate the second end.

19 Claims, 2 Drawing Sheets

(51) Int. Cl.
*B60R 25/023* (2013.01)
*E05B 9/00* (2006.01)

(58) Field of Classification Search
CPC ......... B60R 25/02115; B60R 25/02139; B60R 25/02142
See application file for complete search history.

(56) References Cited

U.S. PATENT DOCUMENTS

| | | | |
|---|---|---|---|
| 3,863,475 A | 2/1975 | Foss | |
| 3,921,422 A | 11/1975 | Walters | |
| 4,009,599 A | 3/1977 | Patriquin | |
| 4,052,870 A * | 10/1977 | Degeye | E05B 29/00 70/492 |
| 4,099,395 A | 7/1978 | Garza | |
| 4,516,415 A | 5/1985 | Kobayashi et al. | |
| 4,724,722 A | 2/1988 | Beauch et al. | |
| 5,076,080 A | 12/1991 | Fuss et al. | |
| 5,092,147 A * | 3/1992 | Mochida | B60R 25/02142 70/252 |
| 5,172,576 A | 12/1992 | Milton | |
| 5,289,707 A | 3/1994 | Suzuki | |
| 6,098,434 A | 8/2000 | Liou | |
| 6,354,117 B1 | 3/2002 | Canard | |
| 6,826,934 B2 * | 12/2004 | Canard | B60R 25/02131 70/181 |
| 7,299,669 B1 * | 11/2007 | Chung | B60R 25/02142 70/186 |
| 8,756,964 B2 * | 6/2014 | Yano | B62H 5/00 70/264 |
| 8,857,231 B2 * | 10/2014 | Perrin | B60R 25/02 70/183 |
| 9,816,290 B2 * | 11/2017 | Yamaguchi | E05B 29/0053 |
| 2004/0012262 A1 | 1/2004 | Uselli | |
| 2016/0298359 A1 * | 10/2016 | Kim | E05B 9/04 |
| 2017/0203718 A1 * | 7/2017 | Perrin | B60R 25/02115 |

FOREIGN PATENT DOCUMENTS

| | | |
|---|---|---|
| CN | 203415476 U | 1/2014 |
| CN | 204792530 U | 11/2015 |

* cited by examiner

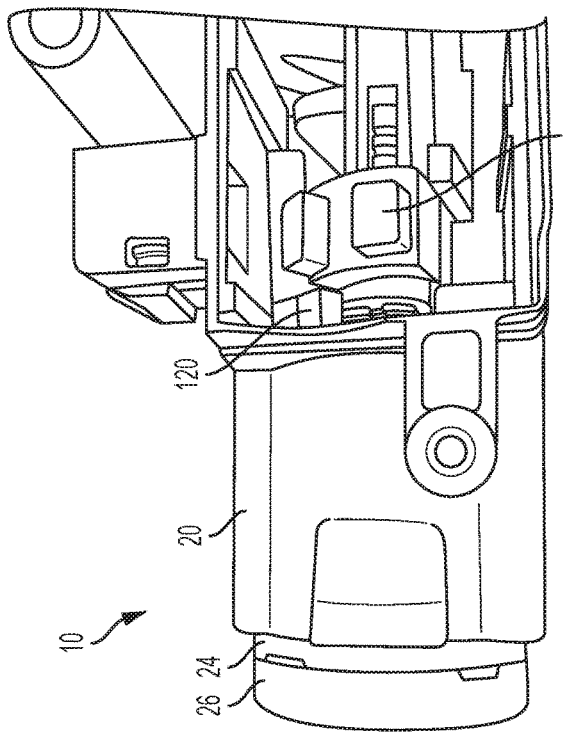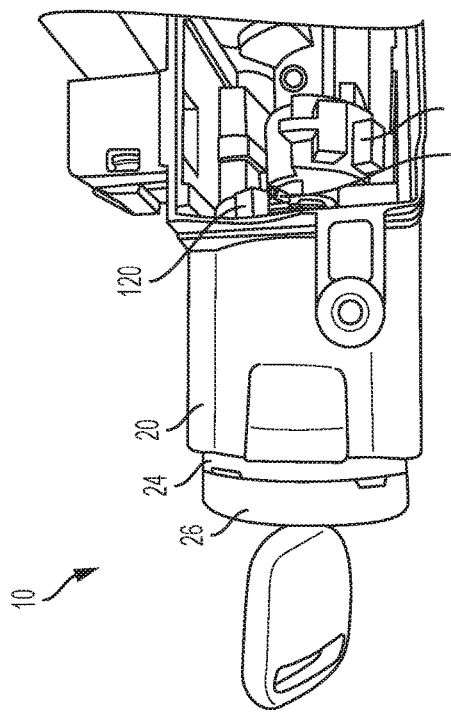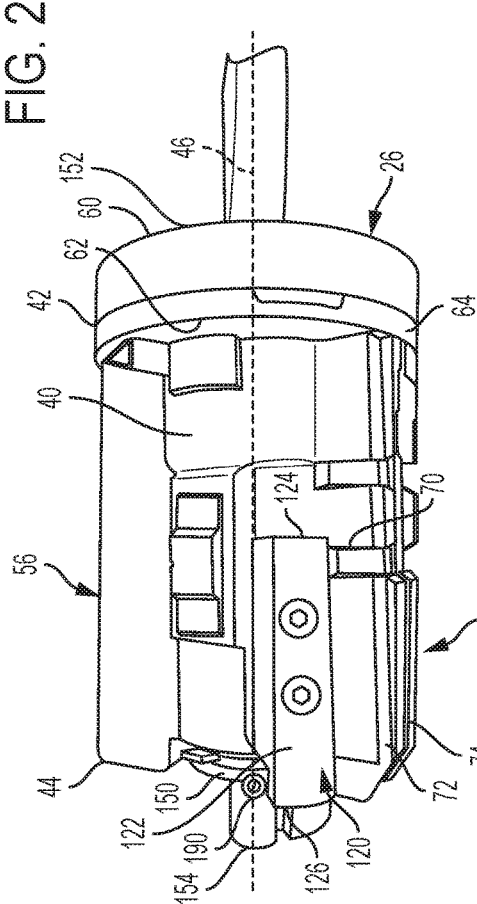

STEERING COLUMN LOCK CYLINDER MODULE

CROSS-REFERENCES TO RELATED APPLICATIONS

This patent application claims priority to U.S. Provisional Patent Application Ser. No. 62/214,061, filed Sep. 3, 2015 which is incorporated herein by reference in its entirety.

BACKGROUND OF THE INVENTION

Vehicles may be provided with an ignition key cylinder. The ignition key cylinder may rotate between a plurality of positions that may correspond to various vehicle states such as "vehicle off", "vehicle off steering column lock", "accessory on", "vehicle run", and "vehicle start". The ignition key cylinder lock may rotate towards a non-run position due to unintended driver contact with the ignition key cylinder or other causes while the ignition key cylinder is in the vehicle run position.

SUMMARY OF THE INVENTION

According to an embodiment of the present disclosure, a lock cylinder module is provided. The lock cylinder module includes a keyed cylinder sleeve being configured to receive a keyed cylinder having a pin. The keyed cylinder sleeve has a first end and a second end. The keyed cylinder includes an elongate body, a first arm, and an anti-rotation feature. The elongate body extends along an axis and has a first face and a second face and a rim surface extending between the first face and the second face, disposed proximate the first end of the keyed cylinder sleeve. The first arm extends from the second face towards the second end. The first arm defines a chamfered region that is disposed proximate a distal end of the first arm. The anti-rotation feature is disposed adjacent to the first arm and is disposed proximate the second end. The pin engages the anti-rotation feature while the keyed cylinder is in a first position to inhibit rotation of the keyed cylinder towards a second position.

According to another embodiment of the present disclosure, a keyed cylinder sleeve is provided. The keyed cylinder sleeve includes a body and an anti-rotation feature. The body extends between a first end and a second end along an axis. The body has a first face and second face disposed about the first end, an inner bore configured to receive a keyed cylinder, and a holding block extending from the second face towards the second end. The anti-rotation feature is connected to the body and is disposed adjacent to the holding and is disposed proximate the second end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a lock cylinder module in a run position;

FIG. 2 is a perspective view of the lock cylinder module in a non-run position;

FIG. 3 is a perspective view of a keyed cylinder received within a keyed cylinder sleeve in the run position;

DETAILED DESCRIPTION

Figure 4:
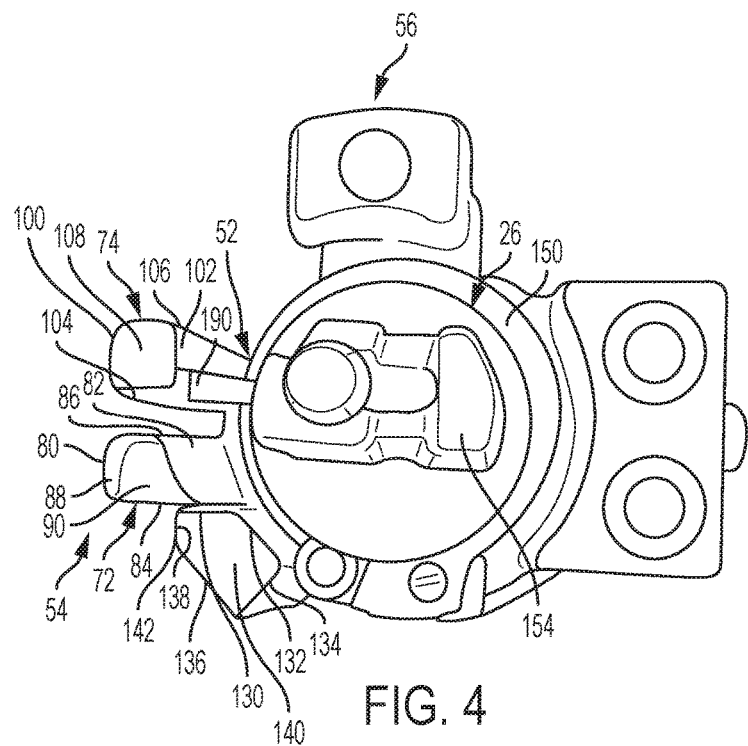
FIG. 4 is an end view of the keyed cylinder received within the keyed cylinder sleeve in a non-run position.

Referring now to the Figures, where the invention will be described with reference to specific embodiments, without limiting same, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 and 2, a lock cylinder module 10 is shown. The lock cylinder module 10 is provided with a vehicle and may be received within a steering column or proximate a steering column. The lock cylinder module 10 may be disposed above a centerline of the steering column such that the lock cylinder module 10 may be a high lock cylinder module. The lock cylinder module 10 is configured to selectively control the operational state of the vehicle. The lock cylinder module 10 may include a component that is rotatable between a plurality of positions that correspond to various operational states of the vehicle. A first position may correspond to a "vehicle run" or "vehicle on" state. A second position may correspond to a "vehicle accessory on" state, a "vehicle off" state, or a "vehicle start" state.

The lock cylinder module 10 is illustrated in the first position (run position) in FIG. 1. The lock cylinder module 10 is illustrated in the second position (non-run position) in FIG. 2. The lock cylinder module 10 includes a lock housing 20, a keyed cylinder sleeve 24, and a keyed cylinder 26.

The lock housing 20 is a casting that defines an inner bore that is configured to receive the keyed cylinder sleeve 24 and the keyed cylinder 26. At least a portion of the keyed cylinder 26 extends within the keyed cylinder sleeve 24 and is operatively connected to an actuator mechanism 30 that is configured to actuate a vehicle ignition switch or vehicle ignition system to change the operational state of the vehicle.

Referring to FIGS. 3 and 4, the keyed cylinder sleeve 24 is configured to receive the keyed cylinder 26. The keyed cylinder sleeve 24 is configured as a generally elongate body 40 that extends between a first end 42 and a second end 44 along an axis 46. The first end 42 of the generally elongate body 40 is disposed further from a centerline of the steering column than the second end 44 of the generally elongate body 40.

The generally elongate body 40 having an inner bore 52, a holding block 54, and a block 56. The elongate body 40 includes a first face 60, a second face 62, and a rim surface 64 that extends between the first face 60 and the second face 62 that are disposed about the first end 42 of the generally elongate body 40. The first face 60 faces towards a passenger compartment of the vehicle. The second face 62 is disposed opposite the first face 60 and faces towards the centerline of the steering column and contacts the inner bore of the lock housing 20 when installed. The rim surface 64 is disposed substantially perpendicular to the first face 60 and the second face 62.

The inner bore 52 extends from the first face 60 through the second face 62 and through the elongate body 40. The inner bore 52 extends from the first end 42 of the elongate body 40 towards the second end 44 of the elongate body 40. The inner bore 52 is configured to receive at least a portion of the keyed cylinder 26.

The holding block 54 extends radially away from the elongate body 40 and extends along a length of the elongate body 40 from the first end 42 towards the second end 44. The holding block 54 is configured to permit proper alignment and orientation of the keyed cylinder sleeve 24 and the keyed cylinder 26 within the lock housing 20. In at least one embodiment, the holding block 54 defines at least one notch 70.

The holding block 54 is defined by a first arm 72 and a second arm 74. In at least one embodiment, each of the first arm 72 and the second arm 74 include at least one notch 70. The first arm 72 and the second arm 74 extend from the second face 62 towards the second end 44 of the elongate body 40. The first arm 72 is spaced apart from and is disposed substantially parallel to the second arm 74.

The first arm 72 includes a first surface 80, a second surface 82, a first side surface 84, a second side surface 86, and a first end surface 88. The first surface 80 may form an exterior surface of the keyed cylinder sleeve 24. The first surface 80 is substantially planar. The second surface 82 is disposed opposite the first surface 80. The second surface 82 is disposed proximate and is spaced apart from the keyed cylinder 26.

The first side surface 84 extends between the first surface 80 and the second surface 82. The first side surface 84 is disposed substantially perpendicular to each of the first surface 80 and the second surface 82. The second side surface 86 is disposed opposite the first side surface 84. The second side surface 86 extends between the first surface 80 and the second surface 82. The second side surface 86 is disposed substantially perpendicular to each of the first surface 80 and the second surface 82.

The first end surface 88 extends between the first surface 80, the second surface 82, the first side surface 84 and the second side surface 86 at a distal end of the first arm 72. The distal end of the first arm 72 is disposed opposite the second face 62. The first end surface 88 is disposed at a non-perpendicular angle with respect to the first surface 80, the second surface 82, the first side surface 84 and the second side surface 86. In at least one embodiment, a cutout or a chamfered region 90 is disposed proximate the distal end of the first arm 72. The chamfered region 90 may be defined by respective ends of the second surface 82, the second side surface 86, and the first end surface 88.

The second arm 74 includes a third surface 100, a fourth surface 102, a third side surface 104, a fourth side surface 106, and a second end surface 108. The third surface 100 may form an exterior surface of the keyed cylinder sleeve 24. The third surface 100 is substantially planar. The fourth surface 102 is disposed opposite the third surface 100. The fourth surface 102 is disposed proximate and is spaced apart from the keyed cylinder 26.

The third side surface 104 extends between the third surface 100 and the fourth surface 102. The third side surface 104 is disposed substantially perpendicular to each of the third surface 100 and the fourth surface 102. The third side surface 104 faces towards the second side surface 86. The fourth side surface 106 is disposed opposite the third side surface 104. The fourth side surface 106 is disposed substantially perpendicular to each of the third surface 100 and the fourth surface 102.

The second end surface 108 extends between the third surface 100, the fourth surface 102, the third side surface 104, and the fourth side surface 106 at a distal end of the second arm 74. The distal end of the second arm 74 is disposed opposite the second face 62. The second end surface 108 is disposed at a non-perpendicular angle with respect to the third surface 100, the fourth surface 102, the third side surface 104, and the fourth side surface 106.

The block 56 extends radially away from the elongate body 40 and extends along a length of the elongate body 40 from the first end 42 towards the second end 44. The block 56 extends from the second face 62 towards the second end 44 of the elongate body 40. The block 56 is radially spaced apart from the first arm 72 and the second arm 74 of the holding block 54 such that the first arm 72 and the second arm 74 of the holding block 54 are circumferentially disposed between the block 56 and an anti-rotation feature 120.

An anti-rotation feature 120 is connected to the generally elongate body 40 of the keyed cylinder sleeve 24. The anti-rotation feature 120 is disposed adjacent to the first arm 72 of the holding block 54. The anti-rotation feature 120 extends proximate the second end 44 of the elongate body 40 of the keyed cylinder sleeve 24. In at least one embodiment, the anti-rotation feature 120 is integrally formed with the generally elongate body 40 of the keyed cylinder sleeve 24.

The anti-rotation feature 120 includes an anti-rotation feature body 122 extending between a first anti-rotation feature end 124 and a second anti-rotation feature end 126 along the axis 46. The first anti-rotation feature end 124 is disposed proximate the at least one notch 70 of the first arm 72 of the holding block 54. The second anti-rotation feature end 126 is disposed proximate the distal end of the first arm 72 of the holding block 54. The second anti-rotation feature end 126 is disposed proximate the second end 44 of the elongate body 40 of the keyed cylinder sleeve 24.

The anti-rotation feature body 122 includes a first ramp surface 130, a first planar surface 132, an end surface 134, a second planar surface 136, a second ramp surface 138, and an end feature surface 140. The first ramp surface 130 is disposed proximate the first side surface 84 and the second surface 82. The first planar surface 132 extends between the first ramp surface 130 and the end surface 134. The first planar surface 132 is disposed proximate and is spaced apart from the keyed cylinder 26. The end surface 134 extends between the first planar surface 132 and the second planar surface 136. The second planar surface 136 is disposed opposite the first planar surface 132. The second ramp surface 138 extends between the second planar surface 136 and the first ramp surface 130.

The first ramp surface 130 and the second ramp surface 138 intersect at an intersection point 142 and extend at an angle with respect to each other. The angle may be an acute angle such that the first ramp surface 130 and the second ramp surface 138 form a wedge.

The end feature surface 140 extends between the first ramp surface 130, the first planar surface 132, the end surface 134, the second planar surface 136, and the second ramp surface 138 at the second anti-rotation feature end.

Figure 5:
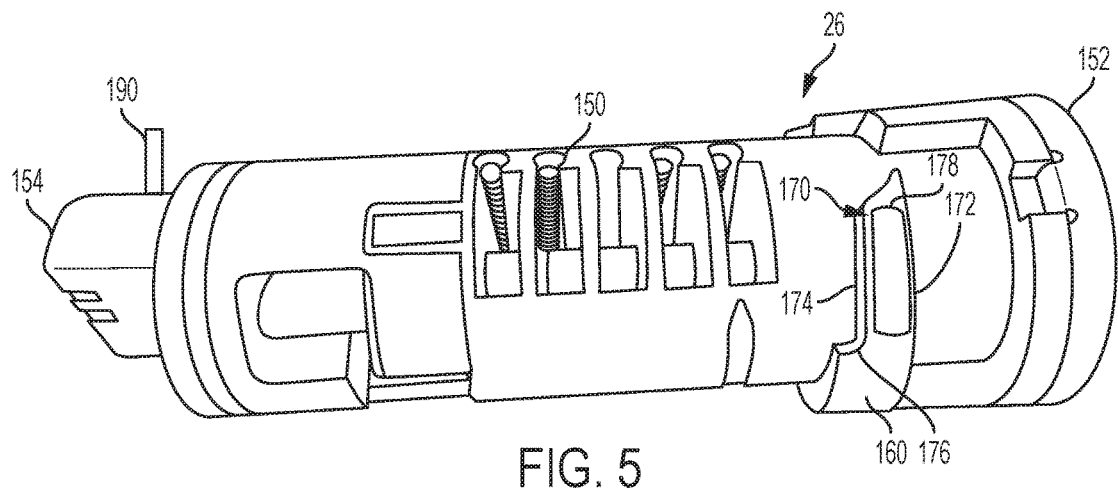
FIG. 5 is a perspective view the keyed cylinder.

Referring to FIGS. 3-5, the keyed cylinder 26 is received within the inner bore 52 of the elongate body 40 of the keyed cylinder sleeve 24. The keyed cylinder 26 is rotatable about the axis 46 and is translatable or longitudinally displaceable along the axis 46. The keyed cylinder 26 is configured to receive a key to rotate the keyed cylinder 26 about the axis 46.

The keyed cylinder 26 includes a tumbler body 150 that extends between a first keyed cylinder end 152 and a second keyed cylinder end 154. The first keyed cylinder end 152 is disposed proximate the first end 42 of the elongate body 40 of the keyed cylinder sleeve 24. In at least one embodiment, the first keyed cylinder end 152 engages the first face 60. The second keyed cylinder end 154 is disposed proximate the second end 44 of the elongate body 40 of the keyed cylinder sleeve 24.

The tumbler body 150 defines a collar 160. The collar 160 is disposed proximate the first keyed cylinder end 152. The collar 160 extends at least partially about the tumbler body 150. The collar 160 defines an integral projection 170 configured as a recess. The integral projection 170 extends from an end of the collar 160 towards the first keyed cylinder end 152. The integral projection 170 includes a first wall 172, a second wall 174, a third wall 176, and a fourth wall 178. The first wall 172 is disposed closer to the first key cylinder end 152 than the second wall 174. The second wall 174 is disposed opposite the first wall 172. The third wall 176 extends between the first wall 172 and the second wall 174. The fourth wall 178 disposed opposite the third wall 176. The fourth wall 178 extends between the first wall 172 and the second wall 174.

The integral projection 170 has a width, W, that is defined by a linear distance between the first wall 172 and the second wall 174. The width of the integral projection 170 may be approximately 3 mm.

The integral projection 170 enables the keyed cylinder 26 to be translatable or longitudinally displaceable along the axis 46. The keyed cylinder 26 is able to translate a distance substantially equal to the width of the integral projection 170.

A pin 190, such as a roll pin, is provided with the keyed cylinder 26. The pin 190 is disposed at the second keyed cylinder end 154. The pin 190 extends radially from the second keyed cylinder end 154 and is disposed substantially perpendicular to the axis 46. The pin 190 is configured to selectively engage the anti-rotation feature 120 to inhibit the inadvertent or unintended rotation of the keyed cylinder 26 from the first position or run position towards the second position or non-run position. In order for the keyed cylinder 26 to move from the first position or run position towards a second position or non-run position, the keyed cylinder 26 must be translated along the axis 46 towards the steering column centerline and then rotated from the first position towards the second position.

Referring to FIGS. 3 and 4, the pin 190 is configured to engage the end surface 134 of the anti-rotation feature 120 while the keyed cylinder 26 is in the first position or run position. The engagement between the pin 190 and the anti-rotation feature 120 inhibits rotation away from the first position towards the second position. In at least one embodiment, the pin 190 is disposed proximate the end surface 134 of the anti-rotation feature 120 while the keyed cylinder 26 is in the first position or run position. The pin 190 engages the end surface 134 of anti-rotation feature 120 in response to an attempted rotation from the first position towards the second position and the anti-rotation feature 120 inhibits rotation away from the first position.

The keyed cylinder 26 may be rotated or moved between the first position and the second position by translating the keyed cylinder 26 along the axis 46 towards the second end 44 of the elongate body 40 of the keyed cylinder sleeve 24. The translation of the keyed cylinder 26 towards the second end of the elongate body 40 extends the pin 190 beyond the end feature surface 140 of the anti-rotation feature 120 and disengages the pin 190 from the end surface 134 of anti-rotation feature 120. The extension of the pin 190 beyond the end feature surface 140 of the anti-rotation feature 120 enables the keyed cylinder 26 to be rotated from the first position towards the second position.

Referring to FIGS. 1 and 4, after the keyed cylinder 26 is rotated from the first position towards a second position while the pin 190 extends beyond the end feature surface 140 of anti-rotation feature 120, the pin 190 is disposed proximate the first ramp surface 130. In at least one embodiment, the ramp surface 130 aids in directing the pin 190 towards the chamfered region 90 to enable the keyed cylinder 26 to move further towards the second position or non-run position.

The combination of the anti-rotation feature 120 provided with the keyed cylinder sleeve 24 and the pin 190 provided with the keyed cylinder inhibits the inadvertent rotation of the keyed cylinder 26 from a run position towards a non-run position without the vehicle operator intentionally commanding or rotating the keyed cylinder 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A lock cylinder module, comprising:
a keyed cylinder sleeve having an elongate body that extends between a first end and a second end along an axis, the keyed cylinder sleeve being arranged to receive a keyed cylinder that extends between a first keyed cylinder end and a second keyed cylinder end, the second keyed cylinder end having a pin being disposed proximate the second end,
the elongate body having,
a first face, second face, and a rim surface extending between the first face and the second face, disposed proximate the first end of the keyed cylinder sleeve;
a first arm extending from the second face towards the second end, the first arm defining a chamfered region disposed proximate a distal end of the first arm and at least one notch; and
an anti-rotation feature disposed adjacent to the first arm and disposed proximate the second end, the pin engaging the anti-rotation feature while the keyed cylinder is in a first position to inhibit rotation of the keyed cylinder towards a second position.

2. The lock cylinder module of claim 1, wherein the anti-rotation feature includes an anti-rotation feature body extending between a first anti-rotation feature end and a second anti-rotation feature end along the axis.

3. The lock cylinder module of claim 2, wherein the anti-rotation feature body has a first ramp surface, an end surface, a first planar surface extending between the first ramp surface and the end surface, a second planar surface disposed opposite the first planar surface, a second ramp surface that extends between the second planar surface and the first ramp surface, and an end feature surface that extends between the first ramp surface, the first planar surface, the end surface, the second planar surface, and the second ramp surface at the second anti-rotation feature end.

4. The lock cylinder module of claim 3, wherein while the keyed cylinder is in the first position, the pin engages the end surface of the anti-rotation feature to inhibit rotation of the keyed cylinder towards the second position.

5. The lock cylinder module of claim 4, wherein in response to translation of the keyed cylinder towards the second end of the keyed cylinder sleeve the pin extends beyond the anti-rotation feature.

6. The lock cylinder module of claim 5, wherein in response to rotation of the keyed cylinder towards the second position about the axis while the pin is extended beyond the anti-rotation, the pin is disposed proximate the ramp surface of the anti-rotation feature to enable the keyed cylinder to further move towards the second position.

7. The lock cylinder of claim 3, wherein the first ramp surface intersects the second ramp surface at an intersection point.

8. The lock cylinder module of claim 2, wherein the first anti-rotation feature end is disposed proximate the at least one notch.

9. A keyed cylinder sleeve, comprising:
a body extending between a first end and a second end along an axis, the body having a first face and a second face disposed about the first end, an inner bore configured to receive a keyed cylinder, and a holding block extending from the second face towards the second end; and
an anti-rotation feature connected to the body and disposed adjacent the holding block, the anti-rotation feature has a first ramp surface, an end surface, a first planar surface extending between the first ramp surface and the end surface, a second planar surface disposed opposite the first planar surface, a second ramp surface that extends between the second planar surface and the first ramp surface, and an end feature surface that extends between the first ramp surface, the first planar surface, the end surface, the second planar surface, and the second ramp surface at an end of anti-rotation feature.

10. The keyed cylinder sleeve of claim 9, wherein the body further defines a block radially spaced apart from the holding block and extending from the second face towards the second end.

11. The keyed cylinder sleeve of claim 9, wherein the holding block includes a first arm and a second arm disposed substantially parallel to the first arm.

12. The keyed cylinder sleeve of claim 11, wherein the second arm defines a chamfered region disposed proximate a distal end of the first arm.

13. The keyed cylinder sleeve of claim 9, wherein the holding block and the anti-rotation feature are spaced apart from the keyed cylinder received within the inner bore.

14. The keyed cylinder sleeve of claim 13, wherein keyed cylinder is rotatable between a first position and a second position and longitudinally displaceable along the axis.

15. The keyed cylinder sleeve of claim 14, wherein while the first position a pin extending from the keyed cylinder engages the end surface of the anti-rotation feature and the anti-rotation feature inhibits rotation of the keyed cylinder from the first position towards the second position.

16. The keyed cylinder sleeve of claim 15, wherein in response to longitudinally displacing keyed cylinder along the axis, the pin extends beyond the end feature surface, and the keyed cylinder is enabled to rotate towards the second position.

17. The keyed cylinder sleeve of claim 16, wherein while the keyed cylinder is in the second position, the pin is disposed proximate the ramp surface and the chamfered region.

18. The keyed cylinder sleeve of claim 17, wherein the first position is a run position of a vehicle ignition system.

19. The keyed cylinder sleeve of claim 17, wherein the second position is a non-run position of the vehicle ignition system.

* * * * *